United States Patent
Liu

(10) Patent No.: US 9,567,468 B1
(45) Date of Patent: Feb. 14, 2017

(54) DURABLE HYDROPHOBIC COATING COMPOSITION FOR METALLIC SURFACES AND METHOD FOR THE PREPARATION OF THE COMPOSITION

(71) Applicant: Jiong Liu, East Brunswick, NJ (US)

(72) Inventor: Jiong Liu, East Brunswick, NJ (US)

(73) Assignee: NEI Corporation, Piscataway, NJ (US)

( * ) Notice: Subject to any disclaimer, the term of this patent is extended or adjusted under 35 U.S.C. 154(b) by 863 days.

(21) Appl. No.: 13/726,376

(22) Filed: Dec. 24, 2012

(51) Int. Cl.
  *C09D 5/00* (2006.01)
(52) U.S. Cl.
  CPC ...................................... *C09D 5/00* (2013.01)
(58) Field of Classification Search
  CPC ............. C08F 251/02; C09D 4/06; C09D 5/00
  See application file for complete search history.

(56) References Cited

U.S. PATENT DOCUMENTS

| | | | |
|---|---|---|---|
| 4,687,707 A | 8/1987 | Matsuo | |
| 5,274,159 A * | 12/1993 | Pellerite et al. | 556/485 |
| 5,922,787 A | 7/1999 | Kondo | |
| 6,716,534 B2 | 4/2004 | Moore | |
| 2003/0139620 A1 | 7/2003 | Yamaguchi | |
| 2005/0020758 A1* | 1/2005 | Terry | 524/492 |
| 2010/0129672 A1 | 5/2010 | Hao | |

* cited by examiner

*Primary Examiner* — Kaj K Olsen
*Assistant Examiner* — Alexander Polyansky
(74) *Attorney, Agent, or Firm* — William L. Botjer

(57) ABSTRACT

A durable hydrophobic coating composition containing fluorinated silanes for metallic surfaces, such as stainless steel surfaces. The composition includes at least one fluorine-containing silane compound, at least one phosphorus-containing silane compound, and at least one hydrolysable compound. This coating is suitable for condenser tubes, among other applications, to promote dropwise condensation.

13 Claims, No Drawings

DURABLE HYDROPHOBIC COATING COMPOSITION FOR METALLIC SURFACES AND METHOD FOR THE PREPARATION OF THE COMPOSITION

STATEMENT OF GOVERNMENT SUPPORT OF THE INVENTION

This invention was made with Government support under Contract No. DE-FG02-08ER85071 awarded by the Department of Energy. The Government has certain rights in the invention.

FIELD OF THE INVENTION

The present invention relates generally to a new type of durable hydrophobic coating for metallic surfaces, and more preferably for stainless steel surfaces, comprising a composition containing fluorinated silanes. This coating is suitable for condenser tubes, among other applications, to promote dropwise condensation. Dropwise condensation can lead to significant enhancement of heat transfer efficiency in condensers by breaking up the insulating condensate film that is commonly seen on untreated metal tubes. Up to now, there have been few literature reports on the industrial applications of dropwise condensation. The key problem has been to device reliable means of promoting long-lived dropwise condensation under industrial conditions. The present invention provides a coating that has a unique combination of properties that includes hydrophobicity/oleophobicity, abrasion resistance and erosion resistance, while providing good adhesion to stainless steel, and is therefore well-suited for producing durable dropwise condensation in industrial condensers.

PRIOR ART

Various efforts have been made to impart hydrophobicity and/or oleophobicity, which are related to the anti-soiling and easy-to-clean properties, to a substrate using compositions comprising fluorinated silanes. For example, U.S. Pat. No. 4,687,707 discloses a low reflectance transparent material having anti-soiling properties, which comprises a thin layer of a condensation product of a fluorine-containing silicon compound having a polyfluorinated or perfluorinated carbon chain. U.S. Pat. No. 5,922,787 describes a composition for forming an anti-fouling film. The composition contains an alkoxysilane compound having a perfluoropolyether group. EP 1300433 discloses thin films made from perfluoropolyether-modified silanes which are said to have good water/oil repellency, parting properties, chemical resistance, lubricity, durability, anti-fouling properties and fingerprint wipe-off. A common feature of the above mentioned examples is that only thin films are formed with the disclosed compositions (preferably less than 100 nm). The scratch resistance and durability of those thin film coatings are not sufficient for demanding industrial applications that requires the coating to be maintained over an extended life time. Further, the aforementioned coating compositions are preferably applicable to a substrate wherein the outmost surface layer contains silicon oxide. Those compositions are not suited for difficult-to-bond substrates such as stainless steel.

U.S. Pat. No. 6,716,534 discloses a composition comprising at least one fluorochemical polyether silane compound (A) having a polyfluoropolyether segment and at least two hydrolysable silane groups per molecule, one non-fluorinated compound (B) having at least two hydrolysable groups per molecule, optionally one crosslinking agent (C), and/or partial condensate thereof. The composition is described to provide durable water, oil and stain repellency to a substrate. One of the disadvantages of this composition is similar to that as described above: only thin film coating can be formed, as the coating composition is typically a diluted solution, containing preferably between 0.01 and 2 percent by weight of compounds (A), (B), optionally (C) and/or partial condensate. Moreover, the coating composition has a very short shelf life, which is typically applied within about 3 to 8 hours from its preparation. This will seriously limit its applicability to industrial applications where a continuous coating process is desirable.

US Pat. Pub. No. 2010/0129672 A1 relates to an easy-to-clean article with a stainless steel surface treated with a coating composition similar to that disclosed in U.S. Pat. No. 6,716,534. The coating compositions according to US Pat. Pub. No. 2010/0129672 A1 appear to have an extended shelf life and can provide better easy-to-clean properties compared to those described in U.S. Pat. No. 6,716,534. Nevertheless, the coating thickness according to US Pat. Pub. No. 2010/0129672 A1 remains very thin (less than 200 nm). Therefore, the abrasion resistance and erosion resistance remain doubtful and, with high possibility, not adequate.

Silanes containing fluoroalkyl or perfluoropolyether groups as shown in the above examples work along the general principles of siloxane chemistry, which involves a hydrolysis step yielding silanol groups followed by a polycondensation reaction. Silanes are widely used in sol-gel synthesis to prepare hybrid inorganic-organic coating systems, which usually exhibit good adherence via covalent bonding to inorganic substrates, such as glass and basic metals, which comprise abundant OH-groups on their surfaces. However, durable adhesion to surfaces of passivated or noble metals, e.g., to stainless steel or copper alloys, could not be obtained. This may be part of the reasons why only very thin coatings like the ones described in US Pat. Pub. No. 2010/0129672 A1 were applied on stainless steel, as the high compliance resulted from the thinness could enable the coating to be conformally attached to the substrate. Nevertheless, these thin coatings wear away quickly, leading to the loss of their function after a short term of use.

In addition to the adhesion issues, to formulate fluorine-containing silanes into a stable coating composition presents a major technical challenge. Due to their inherent non-polar properties and very low solubility, the fluoroalkyl or polyfluoroalkyl groups have a marked thermodynamic incompatibility with most of the common organic polymers and solvents. For this reason, the preparation of coating compositions involving fluorine-containing silanes generally cannot be carried out satisfactorily by means of common sol-gel methods, as the starting compound having fluorinated groups tend to separate, especially at high loading levels, thereby resulting in a two-phase system with which a satisfactory homogenous coating composition cannot be achieved any more. With regard to these matters please see a study by M. Messori et al. [M. Messori, P. Fabbri, F. Pilati, C. Tonelli, and M. Toselli, *Progress in Organic Coatings*, 2011, 72(3), 461-468], where a polycaprolactone segment was added to connect a perfluoropolyether segment with a silicon atom bearing alkoxy groups in order to improve the solubility of the perfluoropolyether groups in a sol-gel based coating formulation. This process involved complicated synthesis steps.

Accordingly, the objective of the present invention is to overcome the above mentioned technical challenges and to provide a sol-gel-based, shelf-stable composition that can lead to a durable hydrophobic coating, which has excellent adhesion to a metallic substrate, particularly to a stainless steel substrate, and which possesses very good abrasion and erosion resistance. Furthermore, it is the objective of the present invention to provide a process for the preparation of the coating composition.

SUMMARY OF THE INVENTION

The present invention provides a composition comprising (A) at least one fluorine-containing silane compound of the general formula (1), (B) at least one phosphorus-containing silane compound of the general formula (2), and (C) at least one hydrolysable compound of the general formula (3), all shown below. In another aspect the present invention provides a coating composition comprising the polycondensates of (A), (B) and (C).

Formula (1):

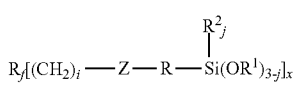

$$R_f[(CH_2)_i-Z-R-Si(OR^1)_{3-j}]_x \quad (1)$$

wherein letter i is an integer of 0 to 3, j is 0 or 1, and x is equal to 1 or 2,
$R_f$ is $C_nF_{2n+1}$ when x=1, wherein n is an integer of 1 to 20, or a divalent perfluoropolyether segment when x=2,
Z is a divalent organic linking group,
R is a divalent hydrocarbon group having 1 to 10 carbon atoms,
$R^1$ is an alkyl group having 1 to 6 carbon atoms, and
$R^2$ is an alkyl group having 1 to 6 carbon atoms.

Formula (2):

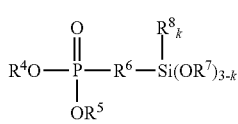

$$R^4O-\underset{\underset{OR^5}{|}}{\overset{\overset{O}{\|}}{P}}-R^6-Si(OR^7)_{3-k} \quad (2)$$

wherein letter k is equal to 0 or 1,
$R^4$ is hydrogen atom or an alkyl group having 1 to 6 carbon atoms,
$R^5$ is hydrogen atom or an alkyl group having 1 to 6 carbon atoms,
$R^6$ is a divalent hydrocarbon group having 1 to 18 carbon atoms,
$R^7$ is an alkyl group having 1 to 6 carbon atoms, and
$R^8$ is an alkyl group having 1 to 6 carbon atoms.

Formula (3):

$$R^9{}_l-MX_{m-l} \quad (3)$$

wherein M represents an element selected from the group consisting of Si, Al, Ti, Zr, B, Ge, V, Pb, Sn and Zn,
$R^9$ is a non-hydrolysable group,
X is a hydrolysable group,
letter m is equal to 3 or 4 depending on the valence of M, and
letter l is equal to 0, 1 or 2.

In a further aspect, the present invention provides a process for preparation of the coating composition defined above, which process comprises a controlled hydrolysis and pre-condensation step where starting compounds (A), (B) and (C) are mixed together and react with water of a less than stoichiometric amount, in the presence of a trace amount of catalyst, thereafter further water and catalyst are added to produce a coating solution containing polycondensates of the starting compounds. The preparation process according to the present invention allows the formation of pre-condensates between the fluorinated starting compound and other hydrolysable starting compounds and thereafter does not result in phase separation upon further addition of water, thereby yielding a stable homogeneous coating solution.

DETAILED DESCRIPTION OF THE PREFERRED EMBODIMENTS

The present invention provides a composition comprising (A) at least one fluorine-containing silane compound of the general formula (1), (B) at least one phosphorus-containing silane compound of the general formula (2), and (C) at least one hydrolysable compound of the general formula (3), all shown below. In another aspect the present invention provides a coating composition comprising the polycondensates of (A), (B) and (C).

Component (A) as used in the present invention comprises at least one fluorine-containing silane compound of general formula (1).

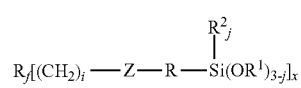

$$R_f[(CH_2)_i-Z-R-Si(OR^1)_{3-j}]_x \quad (1)$$

wherein letter i is an integer of 0 to 3, j is 0 or 1, preferably 0, and x is equal to 1 or 2.

The fluorine-containing silane according to formula (1) may either be a mono-silane containing only one —Si $(OR^1)_{3-j}(R^2)_j$ per molecule (i.e., x=1) or a di-silane containing two —Si$(OR^1)_{3-j}(R^2)_j$ per molecule (i.e., x=2), wherein $R^1$ and $R^2$ represent two alkyl groups (e.g., $C_1$-$C_6$, preferably methyl and ethyl groups), $R^1$ and $R^2$ being identical or different.

Examples of the mono-silane include those comprising a monovalent perfluoroalkyl group, i.e., $R_f$ is $C_nF_{2n+1}$ in formula (1), wherein n is an integer of 1 to 20, preferably 4 to 14, for example, $C_4F_9$—, $C_6F_{13}$—, $C_8F_{17}$—, $C_{10}F_{21}$—, $C_{12}F_{25}$—.

In formula (1), $R_f$ represents a divalent perfluoropolyether segment when a di-silane is chosen. Examples of the divalent perfluoropolyether segment include those having structures formed by alternately bonding divalent fluorinated carbon groups having 1 to 8 carbon atoms, preferably 1 to 3 carbon atoms, and oxygen atoms. The divalent fluorinated carbon groups having 1 to 8 carbon atoms may be of one type or a mixture of two or more types. Specific examples thereof include the groups represented by general formula (4) below.

Formula (4):

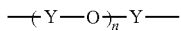

wherein Y is a perfluoroalkyl group, i.e., all C—H bonds are replaced by C—F bonds. The perfluoroalkyl group can be linear, branched or cyclic, all Y's in formula (4) may have the same structure or a plurality of structures may be present at random, in blocks or in alternating arrangements. n represents the number of repeating units and is 1 or more. Preferably, the perfluoroalkyl group Y represents one of the general formulae 4a to 4d below.

Formula (4a):

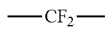

Formula (4b):

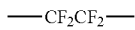

Formula (4c):

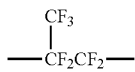

Formula (4d):

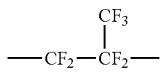

An approximate average structure for the divalent perfluoropolyether segment is represented as —$CF_2O(CF_2CF_2O)_p(CF_2O)_qCF_2$—, wherein average value for p is 0 to about 50 and an average value for q is 0 to about 50, provided that both p and q are not simultaneously 0. Preferably, an average value of p is within a range of 3 to about 40, and an average value of q is within a range of 3 to about 40. As synthesized, the structure typically includes a mixture of polymeric units. The distribution of the repeating units may be regular or random.

In Formula (1), Z is a divalent organic linking group selected from the group of —$CH_2$—, —$CH_2$—O—, —$NR^3$—, —O—CO—, —CO—$NR^3$—, —O—CO—$NR^3$—, —S—, —$SO_3$—, —$SO_2$—$NR^3$—, and combinations thereof, wherein $R^3$ is a hydrogen atom or alkyl group of 1 to 6 carbon atoms. When a di-silane is selected, Z may be the same or different at different ends of the molecule. The divalent linking group Z preferably is substantially stable against hydrolysis. Preferred linking groups Z are —CO—NH—, —O—CO—NH—.

In Formula (1), R is a divalent hydrocarbon group having 1 to 10 carbon atoms, preferably 1 to 4 carbon atoms. $R^1$ is an alkyl group having 1 to 6 carbon atoms, and $R^2$ is an alkyl group having 1 to 6 carbon atoms.

Component (B) as used in the present invention comprises at least one phosphorus-containing silane compound of the general formula (2).

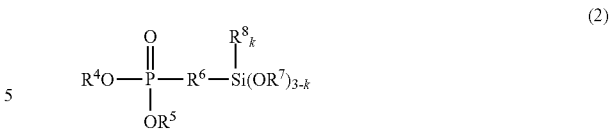

wherein letter k is equal to 0 or 1, preferably equal to 0.

In Formula (2), each of $R^4$ and $R^5$, which may be identical or different, is an alkyl group having 1 to 6 carbon atoms, preferably 1 to 3 carbon atoms. $R^6$ is a divalent hydrocarbon group having 1 to 18 carbon atoms, preferably 1 to 6 carbon atoms, such as alkylene, arylene, and alkylene groups. $R^7$ is an alkyl group having 1 to 6 carbon atoms; $R^8$ is an alkyl group having 1 to 6 carbon atoms.

Several illustrative, non-limiting, examples of the phosphorus-containing silane are given below.
$(CH_3O)_2POCH_2Si(OCH_3)_3$,
$(CH_3CH_2O)_2POCH_2Si(OCH_2CH_3)_3$,
$(CH_3O)_2PO(CH_2)_2Si(OCH_3)_3$,
$(CH_3CH_2O)_2PO(CH_2)_2Si(OCH_2CH_3)_3$,
$(HO)(CH_3O)POCH_2Si(OCH_3)_3$,
$(HO)(CH_3O)POCH_2Si(OCH_2CH_3)_3$,
$(HO)(CH_3O)PO(CH_2)_2Si(OCH_3)_3$,
$(HO)(CH_3O)PO(CH_2)_2Si(OCH_2CH_3)_3$,
$(HO)_2POCH_2Si(OCH_3)_3$,
$(HO)_2POCH_2Si(OCH_2CH_3)_3$,
$(HO)_2PO(CH_2)_2Si(OCH_3)_3$,
$(HO)_2PO(CH_2)_2Si(OCH_2CH_3)_3$,
$(CH_3O)_2POCH_2SiCH_3(OCH_3)_2$,
$(CH_3CH_2O)_2POCH_2Si CH_3(OCH_2CH_3)_2$,
$(CH_3O)_2PO(CH_2)_2Si CH_3(OCH_3)_2$,
$(CH_3CH_2O)_2PO(CH_2)_2Si CH_3(OCH_2CH_3)_2$,
$(HO)(CH_3O)POCH_2SiCH_3(OCH_3)_2$,
$(HO)(CH_3O)POCH_2SiCH_3(OCH_2CH_3)_2$,
$(HO)(CH_3O)PO(CH_2)_2SiCH_3(OCH_3)_2$,
$(HO)(CH_3O)PO(CH_2)_2SiCH_3(OCH_2CH_3)_2$,
$(HO)_2POCH_2SiCH_3(OCH_3)_2$,
$(HO)_2POCH_2SiCH_3(OCH_2CH_3)_2$,
$(HO)_2PO(CH_2)_2SiCH_3(OCH_3)_2$,
$(HO)_2PO(CH_2)_2SiCH_3(OCH_2CH_3)_2$.

Preferred among these are $(CH_3CH_2O)_2PO(CH_2)_2Si(OCH_2CH_3)_3$, commercially known as (2-diethylphosphonatoethyl)triethoxysilane or diethyl [2-(triethoxysilyl)ethyl] phosphonate, and $(CH_3O)_2PO(CH_2)_2Si(OCH_3)_3$.

Component (C) as used in the present invention comprises at least one hydrolysable compound of the general formula (3).

wherein M represents an element of valency l+m, selected from the group consisting of Si, Al, Ti, Zr, B, Ge, V, Pb, Sn and Zn, preferably Si, Al, Ti and Zr or mixture thereof. X is a hydrolysable group; $R^9$ is a non-hydrolysable group; letter m is equal to 3 or 4 depending on the valence of M; and letter l is equal to 0, 1 or 2.

The hydrolysable groups present in component (C) may be identical or different and are generally capable of hydrolyzing in the presence of water. Preferably, the hydrolysable groups upon hydrolysis yield groups that can lead to condensation reactions, such as hydroxyl groups.

Examples of hydrolysable groups X are alkoxy (particularly $C_{1-4}$-alkoxy, such as, e.g., methoxy, ethoxy, n-propoxy and butoxy), aryloxy (particularly $C_{6-10}$-aryloxy, e.g., phenoxy), acyloxy (particularly C1-4-acyloxy, such as, e.g., acetoxy and propylonyloxy) and alkylcarbonyl (e.g., acetyl).

Non-hydrolysable group $R^9$ may be the same or different and are generally not capable of hydrolyzing under acidic or basic aqueous conditions. Examples of non-hydrolysable groups are $C_{1-30}$ alkyl group, $C_{6-30}$ aryl group, and $C_{7-30}$ aralkyl group.

Preferred compounds (C) include tetramethyl orthosilicate, tetraethyl orthosilicate, methyltrimethoxysilane, methyltriethoxysilane, tetramethyl orthotitanate, tetraethyl orthotitanate, tetra-iso-propyl orthotitanate, tetra-n-propyl orthotitanate, tetraethyl zirconate, tetra-iso-propyl zirconate, tetra-n-propyl zirconate, aluminum tri-n-propoxide, aluminium isopropoxide, aluminium sec-butoxide and the like. Single compound or mixtures of compounds (C) may be used.

The coating composition according to present invention is the reaction product of components (A), (B) and (C) in the presence of water ($H_2O$), an acid catalyst and an organic solvent. It is preferred that the molar ratio of components (A) to (B) is 1:1 to 1:20 and particularly preferred 1:3 to 1:15; and the molar ratio of components (B) to (C) is 1:8 to 1:1 and particularly preferred 1:6 to 1:2. The amount of water used is at least a stoichiometric amount that allows all the hydrolysable groups in components (A), (B) and (C) to be hydrolyzed. The acid catalyst can either be an inorganic acid or an organic acid. Examples of the inorganic acids include hydrochloric acid, nitric acid, sulfuric acid and the like alone or in admixture. Examples of the organic acids include methaneosulfonic acid, formic acid, acetic acid, citric acid, oxalic acid and the like alone or in admixture. The acid used preferably follows a molar ratio of (A)+(B)+(C) to acid ranging from 1:0.001 to 1:0.1. In order to obtain a clear and homogeneous coating solution, it is critical that the quantities of the components used should fall within the defined ranges.

The composition of the present invention typically includes one or more organic solvents. Examples of suitable solvents includes aliphatic alcohols (preferably having 1 to 6 carbon atoms), such as methanol, ethanol or isopropylalcohol; ethers, such as diethyl ether or tetrahydrofuran; ketones such as acetone or methyl ethyl ketone; and esters such as ethyl acetate. Particularly preferred solvents include ethanol and tetrahydrofuran or the mixture thereof.

The coating composition according to the present invention is preferably prepared by the following method. First, components (A), (B) and (C) are combined, mixed with a solvent and then undergo a controlled hydrolysis and pre-condensation step by addition of a trace amount of acid catalyst, preferably following a molar ratio of (A)+(B)+(C) to acid ranging from 1:0.001 to 1:0.005, and water of an amount less than half of the stoichiometric amount for full hydrolysis of (A), (B) and (C). The mixture is then allowed to react for a significant time period (e.g., 30 minutes at 80° C., 1 hour at 60° C.). After that additional water and acid catalyst are added to produce a coating solution containing polycondensates of the starting compounds. The additional amount of water added in this step plus the amount added in the pre-condensation step is preferably at least the stoichiometric amount that allows all the hydrolysable groups in components (A), (B) and (C) to be hydrolyzed; and the additional amount of acid catalyst added in this step is preferably about 2-10 times the amount added in the pre-condensation step.

The preparation method according to the present invention allows the formation of pre-condensates of fluorinated compounds (A), phosphorus-containing silane compounds (B) and hydrolysable compounds (C). The term "pre-condensates" refers to oligomeric compounds that have been produced by partial hydrolysis of the corresponding monomeric starting compounds. It is surprisingly found that such pre-condensates lead to improved solubility of the fluorinated groups and does not result in phase separation upon further addition of water, thereby yielding a stable homogeneous coating solution.

The coating composition comprising polycondensates of components (A), (B) and (C) typically has a solid content ranging from 5 wt. % to 40 wt. %, preferably from 8 wt. % to 25 wt. %. The said solid content is calculated based on the assumption that all the hydrolysable groups in the coating formulation transform to oxo groups. The solid content of the coating solution may be adjusted by changing the amounts of organic solvents used for the formulation.

Upon the use of the composition, conventional additives for coatings may be further added, such as, e.g., fillers, colorants, corrosion inhibitors, leveling agent, UV-absorbers and the like.

The coating composition according to the present invention may be applied to a suitable substrate either shortly after its preparation (e.g., up to one hour), or after storing at room temperature for a long time (e.g., up to six months). The coating composition maintains its stability during the storage.

A metallic substrate suitable for coating application is typically cleaned to remove foreign matters such as dust oil, grease and other contamination. Stainless steel substrate, for example, may be cleaned first with an organic solvent (e.g., a ketone such as acetone or an alcohol such as isopropanol), then washed with an alkaline cleaner such as Parco Cleaner 305 (from Henkel). The cleaning may be carried out at room temperature or at an elevated temperature. Techniques for cleaning include wiping, rinsing, brushing and sonicating. Finally, the surface may be thoroughly rinsed with deionized water to remove any residue cleaners, and dried, for example, under a stream of air or nitrogen or at an elevated temperature.

The coating composition can be applied to a suitable substrate using one of the conventional coating techniques. Examples for such techniques are dipping, flooding, casting, spinning, spraying or brushing. Dipping, flooding and spraying are particularly preferred according to the present invention. The coating can be applied to a final thickness of about 500 nm to 10 μm, more preferably of 1 to 6 μm. After coating application the wet coating is typically flash dried at room temperature to allow evaporation of the solvents. Finally, the coating is cured or dried at elevated temperatures between about 120° C. and 200° C., preferably at a temperature of about 150° C.

Upon drying or curing the coating composition on the metallic substrate, tenacious bonds form at the interface of coating and substrate due to the use of the phosphorus-containing silane compounds (B). The phosphorus-containing silane comprises alkoxy-phosphonate groups (e.g., P—O—C groups) that are hydrolysable. These groups upon hydrolysis may react with a metal surface as shown in scheme (1), leading to the formation of up to three strong M-O—P bonds. Unlike the silanol group (Si—OH) in common sol-gel based systems, which can only condense with surface hydroxyl groups, the P═O group is able to directly chelate with metal atoms. The inventers believe that such a reaction scheme is responsible for the excellent adhesion observed for the inventive coating on metallic substrates, particularly on difficult-to-bond substrates such as stainless steel, the surface of which is usually inert due to the limited amounts of surface hydroxyl groups available.

Scheme (1):

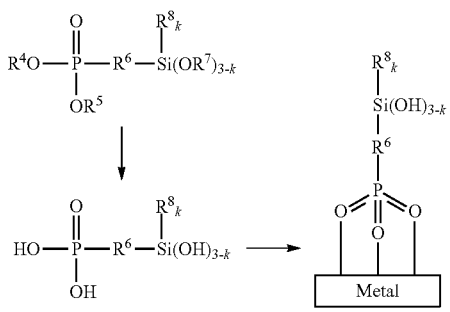

When applied to a metallic surface, the coating composition according to the present invention leads to a very well adhering, highly abrasion resistant and durable coating that possesses high hydrophobicity. The coating is particularly, but not exclusively, useful on stainless steel condenser tubes to promote dropwise condensation. The coating obtained is optically clear. It may also be used to impart anti-fouling and easy-to-clean properties to other metallic surfaces such as brass, chromium, titanium.

The following examples shall illustrate the invention further.

Examples 1 to 3

Comparative Example A and Control Example

For Examples 1 to 3, the coating solutions were prepared in three steps. In Step 1, (heptadecafluoro-1,1,2,2-tetrahydrodecyl)-1-triethoxysilane (HFTEOS, from United Chemical Technologies), tetraethyl orthosilicate (TEOS, from Gelest Inc.), and (2-diethylphosphonatoethyl)triethoxysilane (PHS, from Gelest) were combined and mixed with ethanol, 1% hydrochloric acid (HCl) and deionized water in the amounts indicated in Table 1. After mixing thoroughly, the mixture was kept in an oven at 60° C. for an hour. The mixture was then cooled to room temperature. In Step 2, more 1% HCl and deionized water, in the amounts shown in Table 1, were further added into the solution prepared in Step 1, and the resultant mixture was allowed to react at room temperature for one hour. The total amounts of ingredients added in Step 1 and Step 2 followed a mixing molar ratio of (HFTEOS+TEOS+PHS):$C_2H_5OH$:$H_2O$:HCl=1:3.8:5:4.8×10$^{-3}$, wherein only ¼ of the acid and ⅕ of the water were added in Step 1. A comparative example, Comp. Ex. A as shown in Table 1, was prepared with the same procedure as described above, except that no PHS was used. As indicated in Table 1, different TEOS/PHS molar ratios were followed for Examples 1 to 3. In Step 3, more ethanol in the amounts shown in Table 1 was added for Examples 1 to 3. This was to adjust the solid content of the coating solutions to 16 wt. % (assuming that all the hydrolysable groups in the solution transform to oxo groups), the same as for Comp. Ex. A. The coating solutions prepared with the above procedure all appeared clear and homogeneous. They were further aged overnight before coating application.

For Examples 1 to 3, Comparative Example A and Control Example (i.e., no treatment), 316 stainless steel plates of 1.5 inch by 1.5 inch (for water contact angle measurement and evaluation of adhesion) and/or 4 inch by 4 inch (for evaluation of abrasion resistance) were used. The substrate was wiped with acetone, washed with a lab detergent (Sparkleen 1 from Fisher Scientific), rinsed with deionized water and then dried with compressed air. The stainless steel plates were coated using a flow coating method, where the cleaned substrate was flooded with the coating solution and then placed vertically to drain off the extra solution. The coated samples were placed in an oven and dried at 150° C. for 30 minutes.

The coating adhesion was evaluated with a modified tape test under the guidelines of ASTM D3359, Standard Test Method for Measuring Adhesion by Tape Test. A cross-hatch pattern (1 mm×1 mm) was cut into the coated substrate, and the sample was then immersed in liquid nitrogen for 5 minutes. After the sample was naturally heated up to room temperature, a pressure-sensitive tape was applied at the cross-hatched area. The tape was then rubbed vigorously to ensure good contact with the coating before being quickly pulled away from the sample in a direction parallel to the sample surface. The extent of coating removal was assessed under an optical microscope. The adhesion was rated according to a 0B-5B scale, 0B and 5B corresponding to greater than 65% and 0%, respectively, of coating removal at the cross-hatched area.

The water contact angles (i.e., advancing and receding) were measured with a ramé-hart Model 200 contact angle goniometer. The average values of measurements at 3 different locations (with 30 continuous readings at each location) of the sample are reported in Table 2. The abrasion resistance for Ex. 2 was evaluated with a modified Taber test. A coated 316 stainless steel plate (4 inch by 4 inch) was placed on a Model 5130 Taber Abraser (from Taber Industries) and abraded for 5000 cycles with a Felt CS-5 wheel set (of two, Taber Industries Product#125319). The abrasion was carried out with each wheel bearing a 500 gram weight and the substrate being flooded with deionized water. The vacuum nozzle was removed during the abrasion test. The durability of the coating was evaluated by measuring the water contact angles at the wear track area before and after abrasion cycles.

TABLE 1

| Example | | HFTEOS (gram) | PHS (gram) | TEOS (gram) | $C_2H_5OH$ (gram) | Water (gram) | 1% HCl (gram) | PHS/TEOS molar ratio |
|---|---|---|---|---|---|---|---|---|
| Ex. 1 | Step 1 | 0.88 | 2.91 | 3.69 | 4.89 | 0.38 | 0.12 | 1:2 |
| | Step 2 | | | | | 1.65 | 0.38 | |
| | Step 3 | | | | 3.34 | | | |
| Ex. 2 | Step 1 | 0.98 | 1.93 | 4.91 | 5.42 | 0.42 | 0.13 | 1:4 |
| | Step 2 | | | | | 1.83 | 0.41 | |
| | Step 3 | | | | 2.22 | | | |

TABLE 1-continued

| Example | | HFTEOS (gram) | PHS (gram) | TEOS (gram) | C$_2$H$_5$OH (gram) | Water (gram) | 1% HCl (gram) | PHS/TEOS molar ratio |
|---|---|---|---|---|---|---|---|---|
| Ex. 3 | Step 1 | 1.04 | 1.14 | 5.81 | 5.77 | 0.45 | 0.14 | 1:8 |
| | Step 2 | | | | | 1.95 | 0.43 | |
| | Step 3 | | | | 1.31 | | | |
| Comp. Ex. A | Step 1 | 1.2 | | 7.52 | 6.64 | 0.52 | 0.17 | No PHS |
| | Step 2 | | | | | 2.24 | 0.5 | |

Table 2 summarizes the results of coating appearance, adhesion and water contact angles. Comp. Ex. A exhibited a non-uniform coating with many aggregated domains which formed during the solvent evaporation process due to the incompatibility of the perfluoroalkyl-containing compound (i.e., HFTEOS) with the coating system. The formation of aggregated domains was significantly suppressed on Ex. 3, as a result of the use of PHS in the formulation. As more PHS was added into the coating formulation, an optically clear and uniform coating was observed for both Exs. 1 and 2.

TABLE 2

| Example | Coating Appearance | Adhesion | Water Contact Angle (°) Before Abrasion | | Water Contact Angle (°) After Abrasion | |
|---|---|---|---|---|---|---|
| | | | Advancing | Receding | Advancing | Receding |
| Ex. 1 | Clear, uniform | 5B | 112 | 99 | | |
| Ex. 2 | Clear, uniform | 5B | 117 | 104 | 101 | 81 |
| Ex. 3 | Some aggregated domains | 5B | 120 | 99 | | |
| Comp. Ex. A | Many aggregated domains | 0B | 122 | 95 | | |
| Ctrl. Ex. | | | 55 | 18 | | |

The coating adhesion was excellent for Exs. 1 to 3, with 0% coating removal by the Tape test, whereas the coating was completely removed at the cross-hatched area for Comp. Ex. A. Clearly, the adhesion enhancement observed for Exs. 1 to 3 was due to the use of PHS in their coating formulations.

The coating obtained according to Ex. 2 was tested for its abrasion resistance. After 5000 cycles of abrasion test as described above, no visual marring damage was observed on the wear track, and the water contact angles remained significantly higher than those for the uncoated control sample, Ctrl. Ex.

Examples 4 to 6 and Comparative Examples B to E

For Examples 4 to 5, the coating solutions were prepared in two steps. In Step 1, Fluorolink® S10 (a perfluoropolyether di-silane obtained from Solvay Solexies with the following chemical structure, (C$_2$H$_5$O)$_3$Si—(CH$_2$)$_3$—NH—CO—CF$_2$O(CF$_2$CF$_2$O)$_m$(CF$_2$O)$_n$CF$_2$—CO—NH—(CH$_2$)$_3$—Si(C$_2$H$_5$O)$_3$; molecular weight is 1847), tetraethylorthosilicate (TEOS, from Gelest), and (2-diethylphosphonatoethyl)triethoxysilane (PHS, from Gelest) were combined and mixed with ethanol, tetrahydrofuran (THF), 1% hydrochloric acid (HCl) and deionized water in the amounts indicated in Table 3. After mixing thoroughly, the mixture was kept in an oven at 60° C. for an hour. The mixture was then cooled to room temperature. In Step 2, more HCl and deionized water, in the amounts shown in Table 3, were further added into the solution prepared in Step 1, and the resultant mixture was allowed to age at room temperature overnight before application. The total amounts of ingredients added in Step 1 and Step 2 followed a mixing molar ratio of (Fluorolink® S10+TEOS+PHS):C$_2$H$_5$OH:THF:H$_2$O:HCl=1:0.95:1.818:5:4.8×10$^{-3}$, wherein only ⅓ of the acid and ⅕ of the water were added in Step 1. As indicated in Table 3, the difference between the Ex. 4 and Ex. 5 is the TEOS/PHS molar ratios. Both the coating solutions prepared with the above procedure appeared clear and homogeneous.

Comparative Examples B and C, as shown in Table 3, was prepared with the same procedure as described above, except that a reduced amount of PHS for Comp. Ex. B, and no PHS for Comp. Ex. C, was used. A homogeneous coating solution could not be obtained for both examples. After Step 1, Comp. Ex. B resulted in a fluffy precipitate, and Comp. Ex. C led to a hard precipitate. Further addition of HCl and water in Step 2 did not clear up the solutions.

Comparative Example D, as shown in Table 3, was prepared with the same formulation as for Ex. 5, except that the total amounts of water and HCl were added in a single step. A homogeneous coating solution could not be obtained for this example. Hard precipitate formed when all the ingredients were mixed.

TABLE 3

| Example | | Fluorolink® S10 (gram) | PHS (gram) | TEOS (gram) | C$_2$H$_5$OH (gram) | THF (gram) | Water (gram) | 1% HCl (gram) | PHS/TEOS molar ratio |
|---|---|---|---|---|---|---|---|---|---|
| Ex. 4 | Step 1 | 1.37 | 3.97 | 5.04 | 1.62 | 4.85 | 0.45 | 0.22 | 1:2 |
| | Step 2 | | | | | | 2.24 | 0.43 | |
| Ex. 5 | Step 1 | 1.37 | 2.38 | 6.04 | 1.62 | 4.85 | 0.45 | 0.22 | 1:4 |
| | Step 2 | | | | | | 2.24 | 0.43 | |

TABLE 3-continued

| Example | | Fluorolink® S10 (gram) | PHS (gram) | TEOS (gram) | C$_2$H$_5$OH (gram) | THF (gram) | Water (gram) | 1% HCl (gram) | PHS/TEOS molar ratio |
|---|---|---|---|---|---|---|---|---|---|
| Comp. Ex. B | Step 1 | 1.37 | 1.32 | 6.71 | 1.62 | 4.85 | 0.45 | 0.22 | 1:8 |
| | Step 2 | | | | | | 2.24 | 0.43 | |
| Comp. Ex. C | Step 1 | 1.37 | | 7.55 | 1.62 | 4.85 | 0.45 | 0.22 | No PHS |
| | Step 2 | | | | | | 2.24 | 0.43 | |
| Comp. Ex. D | | 1.37 | 2.38 | 6.04 | 1.62 | 4.85 | 2.69 | 0.65 | 1:4 |

Coating Solution for Example 6:

A stock coating solution was prepared following the same procedure and formulation as for Ex. 5 mentioned above. This solution has a solid content of 20 wt. % (assuming that all the hydrolysable groups in the solution transform to oxo groups). 10 grams of the stock solution was mixed with 2.5 grams ethanol and 7.5 grams tetrahydrofuran, resulting in a diluted solution having a solid content of 10 wt. %.

Coating Solution for Comparative Examples E:

0.25 grams coating solution for Example 6, as prepared following the above procedure and formulation, was further diluted with 4.37 grams ethanol and 13.10 grams tetrahydrofuran, resulting in a coating solution having a solid content of 1.4 wt. %.

Coating Solution for Comparative Examples F:

This solution was prepared according to Preparation 8 as disclosed in US Pat. Pub. No. 2010/0129672 A1. A Mixture 1 was first prepared by combining 0.5 grams Fluorolink® S10 with 3 grams tetraethyl orthosilicate (TEOS), and 1.5 grams ethanol to provide a solution of 60 wt. % TEOS, 30 wt. % ethanol, and 10 wt. % Fluorolink® S10. 1 gram Mixture 1 was then combined with 0.68 grams 3-glycidoxy-propyltrimethoxysilane (GPTS, from Gelest Inc.) and 1.02 grams methyltriethoxysilane (MTS, from Gelest Inc.) in 91 grams ethanol to form a solution. 6.25 gram water was then added, and the resulting mixture was shaken. 0.05 grams concentrated hydrochloric acid (HCl) was then added, and the resulting mixture was shaken again. The solution was applied about one hour after the preparation.

For Examples 5 and 6, and Comparative Examples E and F, 316 stainless steel plates of 1.5 inch by 1.5 inch (for water contact angle measurement and evaluation of adhesion) and/or 4 inch by 4 inch (for evaluation of abrasion resistance) were used. The substrate was wiped with acetone, washed with a lab detergent (Sparkleen 1 from Fisher Scientific), rinsed with deionized water and then dried with compressed air. The stainless steel plates were coated using a flow coating method, where the cleaned substrate was flooded with the coating solution and then placed vertically to drain off the extra solution. The coated samples were placed in an oven and dried at 100° C. for 30 minutes followed by 150° C. for 30 minutes.

The coating thickness was determined with a scanning electron microscope by examining the cross section of the samples. The coating adhesion was evaluated with a modified tape test under the guidelines of ASTM D3359, Standard Test Method for Measuring Adhesion by Tape Test. A cross-hatch pattern (1 mm×1 mm) was cut into the coated substrate, and the sample was then immersed in liquid nitrogen for 5 minutes. After the sample was naturally heated up to room temperature, a pressure-sensitive tape was applied at the cross-hatched area. The tape was then rubbed vigorously to ensure good contact with the coating before being quickly pulled away from the sample in a direction parallel to the sample surface. The extent of coating removal was assessed under an optical microscope. The adhesion was rated according to a 0B-5B scale, 0B and 5B corresponding to greater than 65% and 0%, respectively, of coating removal at the cross-hatched area. Table 4 summarizes the results of coating appearance, thickness and adhesion.

The water contact angles (i.e., advancing and receding) were measured with a ramé-hart Model 200 contact angle goniometer. The average values of measurements at 3 different locations (with 30 continuous readings at each location) of the sample are reported in Table 2. The abrasion resistance for Ex. 2 was evaluated with a modified Taber test. A coated 316 stainless steel plate (4 inch by 4 inch) was placed on a Model 5130 Taber Abraser (from Taber Industries) and abraded for various cycles with a Felt CS-5 wheel set (of two, Taber Industries Product#125319). The abrasion was carried out with each wheel bearing a 500 gram weight and the substrate being flooded with deionized water. The vacuum nozzle was removed during the abrasion test. The durability of the coating was evaluated by measuring the water contact angles at the wear track area before and after abrasion cycles. Table 5 summarizes the results of water contact angles before and after abrasion.

The coatings prepared according to Exs. 5 and 6 showed very good adhesion with the stainless steel substrate and excellent durability against abrasion. After 5000 cycles of abrasion test as described above, no visual marring damage was observed on the wear track, and the water angles only decreased slightly for both samples. In contrast, for Comp. Exs. E and F, the water contact angles decreased drastically after only 500 cycles of abrasion. In fact, these coatings were removed during aggressive abrasion tests. The poor abrasion resistance of these samples was due to the thinness of the coating (less than 100 nm).

TABLE 4

| Example | Coating Appearance | Coating Thickness | Adhesion |
|---|---|---|---|
| Ex. 5 | Clear, uniform | 4 µm | 5B |
| Ex. 6 | Clear, uniform | 2 µm | 5B |
| Comp. Ex. E | Non-uniform | <100 nm | 5B |
| Comp. Ex. F | Clear, uniform | <100 nm | 5B |

TABLE 5

| Example | Advancing Water Contact Angle (°) | | | Receding Water Contact Angle (°) | | |
|---|---|---|---|---|---|---|
| | Before Abrasion | After Abrasion 500 cycles | After Abrasion 5000 cycles | Before Abrasion | After Abrasion 500 cycles | After Abrasion 5000 cycles |
| Ex. 5 | 120 | 117 | 116 | 104 | 103 | 94 |
| Ex. 6 | 120 | 118 | 104 | 105 | 100 | 84 |
| Comp. Ex. E | 107 | 93 | 94 | 78 | 36 | 33 |
| Comp. Ex. F | 114 | 83 | 73 | 92 | 42 | 26 |

Example 7

30.12 grams Fluorolink® S10 (a perfluoropolyether disilane obtained from Solvay Solexies with the following chemical structure, $(C_2H_5O)_3Si—(CH_2)_3—NH—CO—CF_2O(CF_2CF_2O)_m(CF_2O)_nCF_2—CO—NH—(CH_2)_3—Si(C_2H_5O)_3$; molecular weight is 1847), 133.97 grams tetraethylorthosilicate (TEOS, from Gelest), and 52.80 gram (2-diethylphosphonatoethyl)triethoxysilane (PHS, from Gelest) were combined and mixed with 35.57 grams ethanol, 106.71 gram tetrahydrofuran (THF), 4.75 gram 1% hydrochloric acid (HCl) and 9.95 grams deionized water. After mixing thoroughly, the mixture was kept in an oven at 60° C. for an hour. After the mixture was cooled to room temperature, additional 9.51 grams 1% HCl and 49.20 grams deionized water were added, and the resultant mixture was thoroughly mixed and allowed to react at room temperature for an hour. After that, 111.78 grams ethanol and 447.12 gram THF were added into the coating solution. The solution was allowed to age overnight before application.

The coating solution was applied to a 4-feet long stainless steel U-tube bundle (Type 4-Y-48 MAHTR-2-B-C1, obtained from APS Heat Transfer) having 24 U-tubes. The tube bundle was first washed with acetone and then a lab detergent (Sparkleen 1, from Fisher Scientific) solution, thoroughly rinsed with deionized water, and dried in open air. The tube bundle was installed in the shell that comes with it. The coating solution as prepared above was poured into the shell. After properly sealing the shell, the assembly of shell and tube bundle was tumbled several times to allow the coating solution to fully wet the outside surface of the tubes. The assembly was then placed vertically on the ground, and the tube bundle was disassembled and slowly taken out of the shell by lifting it up with a chainfall. A uniform coating formed on the outside surface of the tubes through the whole bundle. The coated bundle was flash dried in open air, and then in a tube furnace at 150° C. for 30 minutes.

The coated tube bundle was installed in a condenser testing rig, where the bundle was housed in a transparent shell (made with polycarbonate) connected with a steam supply, and the tube side of the bundle was connected with cooling water flow. Continuous and durable dropwise condensation was observed on the outside surface of the tubes under the following conditions: steam temperature 162-185° F., cooling water temperature 70-85° F., shell side vacuum 5-8 psia. After a testing period of 96 hours, no degradation of coating was observed.

The present invention has been described with respect to the above exemplary embodiments, However, as those skilled in the art will recognize, modifications and variation sin the specific details which have been described may be resorted to without departing from the spirits and scope of the invention as defined in the appended claims.

What is claimed is:

1. A liquid coating composition for metallic surfaces consisting of:
   (A) at least one fluorine-containing silane compound of the formula (1),
   (B) at least one phosphorus-containing silane compound selected from the group consisting of $(CH_3CH_2O)_2PO(CH_2)_2Si(OCH_2CH_3)_3$ and $(CH_3O)_2PO(CH_2)_2Si(OCH_3)_3$,
   (C) at least one hydrolysable compound of the formula (2), wherein the molar ratio of compounds (A) to (B) is 1:1 to 1:20; and the molar ratio of compounds (B) to (C) is 1:8 to 1:1; and wherein the coating composition is a homogeneous liquid and
   (D) water, at least one acid and at least one organic solvent Formula (1):

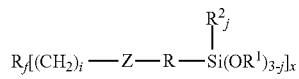

wherein letter i is an integer of 0 to 3, j is 0 or 1, and x is equal to 1 or 2,
$R_f$ is $C_nF_{2n+1}$ when x=1, wherein n is an integer of 1 to 20, or a divalent perfluoropolyether segment when x=2,
Z is a divalent organic linking group,
R is a divalent hydrocarbon group having 1 to 10 carbon atoms,
$R^1$ is an alkyl group having 1 to 6 carbon atoms, and
$R^2$ is an alkyl group having 1 to 6 carbon atoms Formula (2):

wherein M represents an element selected from the group consisting of Si, Al, Ti, Zr, B, Ge, V, Pb, Sn and Zn,
$R^9$ is a non-hydrolysable group,
X is a hydrolysable group,
letter m is equal to 3 or 4 depending on the valence of M, and
letter l is equal to 0, 1 or 2.

2. The coating composition as claimed in claim 1, wherein the divalent organic linking group Z in compound (A) is selected from the group consisting of —$CH_2$—, —$CH_2$—O—, —$NR^3$—, —O—CO—, —CO—$NR_3$—, —O—CO—$NR^3$—, —S—, —$SO_3$—, —$SO_2$—$NR^3$—, and combinations thereof, wherein $R^3$ is a hydrogen atom or alkyl group of 1 to 6 carbon atoms.

3. The coating composition as claimed in claim 1, wherein the divalent organic linking group Z in compound (A) is —CO—NH— or —O—CO—NH—.

4. The coating composition as claimed in claim 1, wherein the compound (C) is selected from the group consisting of tetramethyl orthosilicate, tetraethyl orthosilicate, methyltrimethoxysilane, methyltriethoxysilane, tetramethyl orthotitanate, tetraethyl orthotitanate, tetra-iso-propyl orthotitanate, tetra-n-propyl orthotitanate, tetraethyl zirconate, tetra-iso-propyl zirconate, tetra-n-propyl zirconate, aluminum tri-n-propoxide, aluminium isopropoxide, and aluminium sec-butoxide.

5. The coating composition as claimed in claim 1, wherein the molar ratio of compounds (A) to (B) is 1:3 to 1:15; and the molar ratio of compounds (B) to (C) is 1:6 to 1:2.

6. The coating composition as claimed in claim 1 having a solid content ranging from 5 wt. % to 40 wt. %, the solid content being calculated such that all the hydrolysable groups in the coating formulation transform to oxo groups.

7. A liquid coating composition for metallic surfaces consisting of:
(A) a perfluoropolyether di-silane having the formula $(C_2H_5O)_3Si$—$(CH_2)_3$—NH—CO—$CF_2O(CF_2CF_2O)_m$$(CF_2O)_nCF_2$—CO—NH—$(CH_2)_3$—$Si(C_2H_5O)_3$,
(B) (2-diethylphosphonatoethyl)triethoxysilane or diethyl [2-(triethoxysilyl)ethyl]phosphonate, and
(C) tetraethylorthosilicate wherein the molar ratio of compounds (A) to (B) is 1:1 to 1:20; and the molar ratio of compounds (B) to (C) is 1:6 to 1:2 and wherein the coating composition is a homogeneous liquid; and
(D) water, at least one acid and at least one organic solvent.

8. The coating composition as claimed in claim 7 having a solid content ranging from 5 wt. % to 40 wt. %, the solid content being calculated when all the hydrolysable groups in the coating formulation are transformed to oxo groups.

9. A liquid coating composition for metallic surfaces consisting of:
(A) at least one fluorine-containing silane compound of the formula (1),
(B) a compound selected from the group consisting of $(CH_3CH_2O)_2PO(CH_2)_2Si(OCH_2CH_3)_3$ and $(CH_3O)_2PO(CH_2)_2Si(OCH_3)_3$ and
(C) at least one hydrolysable compound selected from the group consisting of tetramethyl orthosilicate, tetraethyl orthosilicate, methyltrimethoxysilane, methyltriethoxysilane, tetramethyl orthotitanate, tetraethyl orthotitanate, tetra-iso-propyl orthotitanate, tetra-n-propyl orthotitanate, tetraethyl zirconate, tetra-iso-propyl zirconate, tetra-n-propyl zirconate, aluminum tri-n-propoxide, aluminium isopropoxide, and aluminium sec-butoxide; and
(D) wherein the molar ratio of compounds (A) to (B) is 1:1 to 1:20; and the molar ratio of compounds (B) to (C) is 1:8 to 1:1; and wherein the coating composition is a homogeneous liquid; and
(E) water, at least one acid and at least one organic solvent Formula (1):

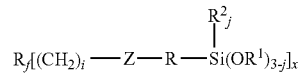

wherein letter i is an integer of 0 to 3, j is 0 or 1, and x is equal to 1 or 2, $R_f$ is $C_nF_{2n+1}$ when x=1, wherein n is an integer of 1 to 20, or a divalent perfluoropolyether segment when x=2, Z is a divalent organic linking group selected from the group of —$CH_2$—, —$CH_2$—O—, —$NR^3$—, —O—CO—, —CO—$NR_3$—, —O—CO—$NR^3$—, —S—, —$SO_3$—, —$SO_2$—$NR^3$—, and combinations thereof, wherein $R^3$ is a hydrogen atom or alkyl group of 1 to 6 carbon atoms R is a divalent hydrocarbon group having 1 to 10 carbon atoms, $R^1$ is an alkyl group having 1 to 6 carbon atoms, and $R^2$ is an alkyl group having 1 to 6 carbon atoms.

10. The coating composition as claimed in claim 9, wherein the molar ratio of compounds (A) to (B) is 1:3 to 1:15; and the molar ratio of compounds (B) to (C) is 1:6 to 1:2.

11. The coating composition as claimed in claim 9 having a solid content ranging from 5 wt. % to 40 wt. %, the solid content being calculated when all the hydrolysable groups in the coating formulation are transformed to oxo groups.

12. The coating composition as claimed in claim 9 wherein the coating is optically clear.

13. The coating composition as claimed in claim 1 wherein the coating is optically clear.

* * * * *